United States Patent
Hundemer

(10) Patent No.: US 9,489,986 B2
(45) Date of Patent: Nov. 8, 2016

(54) USE OF PROGRAM-SCHEDULE TEXT AND TELEPROMPTER OUTPUT TO FACILITATE SELECTION OF A PORTION OF A MEDIA-PROGRAM RECORDING

(71) Applicant: Tribune Broadcasting Company, LLC, Chicago, IL (US)

(72) Inventor: Hank Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 82 days.

(21) Appl. No.: 14/627,164

(22) Filed: Feb. 20, 2015

(65) Prior Publication Data

US 2016/0247541 A1    Aug. 25, 2016

(51) Int. Cl.
| | | |
|---|---|---|
| *H04N 5/92* | (2006.01) | |
| *G11B 27/34* | (2006.01) | |
| *H04N 7/088* | (2006.01) | |
| *H04N 5/85* | (2006.01) | |
| *G11B 27/10* | (2006.01) | |
| *G11B 27/28* | (2006.01) | |
| *H04N 5/222* | (2006.01) | |

(52) U.S. Cl.
CPC ............ *G11B 27/34* (2013.01); *G11B 27/105* (2013.01); *G11B 27/28* (2013.01); *H04N 5/2222* (2013.01); *H04N 5/85* (2013.01); *H04N 7/0885* (2013.01)

(58) Field of Classification Search
CPC .................. H04N 5/913; H04N 2005/91314; H04N 5/782; H04N 21/47214; H04N 21/4334; H04N 5/76; H04N 5/765; G11B 20/00086; G11B 27/105; G11B 2220/20
USPC ................................................. 386/245, 291
See application file for complete search history.

(56) References Cited

U.S. PATENT DOCUMENTS

| | | |
|---|---|---|
| 8,201,197 B1 | 6/2012 | Holliday et al. |
| 2001/0030661 A1 | 10/2001 | Reichardt |
| 2002/0073422 A1 | 6/2002 | Lee |

(Continued)

FOREIGN PATENT DOCUMENTS

| | | | |
|---|---|---|---|
| EP | 0648054 A2 * | 4/1995 | ....... G06F 17/30796 |
| JP | H09172597 A | 6/1997 | |

OTHER PUBLICATIONS

International Search Report mailed on Apr. 18, 2016 issued in connection with International Application No. PCT/US2015/067382, filed on Dec. 22, 2015, 3 pages.

(Continued)

*Primary Examiner* — William Tran
(74) *Attorney, Agent, or Firm* — McDonnell Boehnen Hulbert & Berghoff LLP

(57) ABSTRACT

In one aspect, an example method involves accessing first data representing a program schedule of a media program; making a determination that first text of the program schedule matches second text displayed by a teleprompter, where a portion of the media program was recorded proximate a time when the second text was displayed; using the first text of the program schedule as a basis to select a portion of the program schedule; and responsive to at least the determination, storing data indicative of a correlation between (i) the selected portion of the program schedule and (ii) the recorded portion of the media program. An example non-transitory computer-readable medium and an example computing device, both related to the example method, are also disclosed herein.

20 Claims, 6 Drawing Sheets

(56) References Cited

U.S. PATENT DOCUMENTS

| | | | |
|---|---|---|---|
| 2003/0084443 A1 | 5/2003 | Laughlin et al. | |
| 2005/0283717 A1 | 12/2005 | Giraldo et al. | |
| 2007/0154171 A1* | 7/2007 | Elcock | H04N 9/8205 386/230 |
| 2008/0282155 A1 | 11/2008 | Kempanna | |
| 2009/0263098 A1* | 10/2009 | Hyun | H04N 5/85 386/278 |
| 2010/0205632 A1 | 8/2010 | VanDuyn et al. | |
| 2011/0069230 A1 | 3/2011 | Polumbus et al. | |
| 2011/0246571 A1 | 10/2011 | Klier et al. | |
| 2012/0033948 A1* | 2/2012 | Rodriguez | G11B 27/34 386/282 |
| 2012/0323564 A1* | 12/2012 | Fujii | G11B 27/105 704/9 |
| 2013/0232167 A1 | 9/2013 | Vidra | |
| 2014/0059058 A1 | 2/2014 | Ohtsuki et al. | |
| 2014/0129235 A1* | 5/2014 | Suvanto | G10L 15/22 704/276 |
| 2014/0270702 A1 | 9/2014 | Hundemer et al. | |
| 2015/0071604 A1 | 3/2015 | Yamashita et al. | |

OTHER PUBLICATIONS

Written Opinion of the International Searching Authority mailed on Apr. 18, 2016 issued in connection with International Application No. PCT/US2015/067382, filed on Dec. 22, 2015, 4 pages.

Specification and Figures filed Feb. 20, 2015 for U. S. Appl. No. 14/627,119, 37 pages.

International Search Report mailed on Apr. 15, 2016 issued in connection with International Application No. PCT/US2015/067345, filed Dec. 22, 2015, 4 pages.

Written Opinion of the International Searching Authority mailed on Apr. 15, 2016 issued in connection with International Application No. PCT/US2015/067345, filed on Dec. 22, 2015, 4 pages.

Non-Final Office Action mailed on Jun. 14, 2016, issued in connection with U. S. Appl. No. 14/627,119, filed Feb. 20, 2015, 13 pages.

* cited by examiner

302 →

In local news, 43-year old man John Doe won the lottery today. He has opted to accept the lump sum payment of 30 million dollars instead of the 20-year annuity amounting to 200 million dollars. When asked why he opted for the lump sum, John said, "I really feel like spending my winnings impulsively on the first frivolous items that pop into my head is the best thing for me right now." ← 306

John's coworker Rhonda Regret claims that she gave John half of the money that John used to purchase the winning ticket, and plans to file a lawsuit for half of the prize.

FIG. 3B

USE OF PROGRAM-SCHEDULE TEXT AND TELEPROMPTER OUTPUT TO FACILITATE SELECTION OF A PORTION OF A MEDIA-PROGRAM RECORDING

USAGE AND TERMINOLOGY

In this disclosure, unless otherwise specified and/or unless the particular context clearly dictates otherwise, each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

A media program may include multiple portions. For example, a news program may include various news stories, such as sports news stories, local news stories, national news stories, weather reports, etc. In some instances, the media program may be recorded for later viewing and/or listening. Also, in some instances, it may be useful to select from the recording, a particular portion of the media program so that the selected portion may be used independently of the rest of the recording.

SUMMARY

In a first aspect, an example method involves accessing first data representing a program schedule of a media program; making a determination that first text of the program schedule matches second text displayed by a teleprompter, where a portion of the media program was recorded proximate a time when the second text was displayed; using the first text of the program schedule as a basis to select a portion of the program schedule; and responsive to at least the determination, storing data indicative of a correlation between (i) the selected portion of the program schedule and (ii) the recorded portion of the media program.

In a second aspect, an example non-transitory computer-readable medium has stored thereon instructions that when executed by a processor, cause performance of a set of acts involving accessing first data representing a program schedule of a media program; making a determination that first text of the program schedule matches second text displayed by a teleprompter, where a portion of the media program was recorded proximate a time when the second text was displayed; using the first text of the program schedule as a basis to select a portion of the program schedule; and responsive to at least the determination, storing data indicative of a correlation between (i) the selected portion of the program schedule and (ii) the recorded portion of the media program.

In a third aspect, an example computing device includes a processor, a communication interface, and a non-transitory computer-readable medium having instructions stored thereon that when executed by the processor cause performance of a set of acts including accessing, via the communication interface, first data representing a program schedule of a media program; making a determination that first text of the program schedule matches second text displayed by a teleprompter, where a portion of the media program was recorded proximate a time when the second text was displayed; using the first text of the program schedule as a basis to select a portion of the program schedule; and responsive to at least the determination, storing data indicative of a correlation between (i) the selected portion of the program schedule and (ii) the recorded portion of the media program.

These, as well as other aspects, alternatives, and advantages, will become apparent to those of ordinary skill in the art by reading the following detailed description, with reference where appropriate to the accompanying drawings.

BRIEF DESCRIPTION OF THE DRAWINGS

FIG. 3B depicts a portion of the example program schedule of FIG. 3A in greater detail;

DETAILED DESCRIPTION

I. Overview

As noted above, it may be desirable to select from a recording of a media program a portion representing a particular portion of the media program. One way to select the portion may be for an editor to view the recording and to indicate when the portion begins and ends. For example, the editor may mark beginning and ending video frames of the portion. However, this process may be burdensome and time-consuming.

To help improve this process, a computing device may correlate portions of a program schedule of the media program with respective portions of the recording. A program schedule of a media program is a schedule or a summary of the media program, and is typically used to facilitate the production of the media program, such as by coordinating the use of various media-content items. In one example, the program schedule may include text corresponding to a sequence of media-program portions (e.g., news stories) that make up the media program, or may include text for an anchorperson to read aloud as the media program progresses. By correlating portions of a program schedule of a media program with respective portions of a recording of the media program, a computing device may provide an intuitive user interface that allows a user to select a portion of the media program by selecting a portion of the program schedule.

According to the present disclosure, the computing device may correlate portions of the program schedule with respective portions of the recording based on a match between text in the program schedule and text displayed by a teleprompter. For example, the computing device may access first data representing the program schedule. The computing device may then make a determination that first text of the program schedule matches second text displayed by the teleprompter, where a portion of the media program is recorded proximate a time when the second text was displayed by the teleprompter. The computing device may then use the first text of the program schedule as a basis to select a portion of the program schedule. Finally, in response to at least the determination that the first text of the program schedule matches the second text displayed by the teleprompter, the computing device may store data indicative of a correlation between the selected portion of the program schedule and the recorded portion of the media program. In one example, the stored data may be arranged in a table that maps the selected portion of the program schedule to the recorded portion of the media program.

II. Example Systems and Devices

Figure 1:
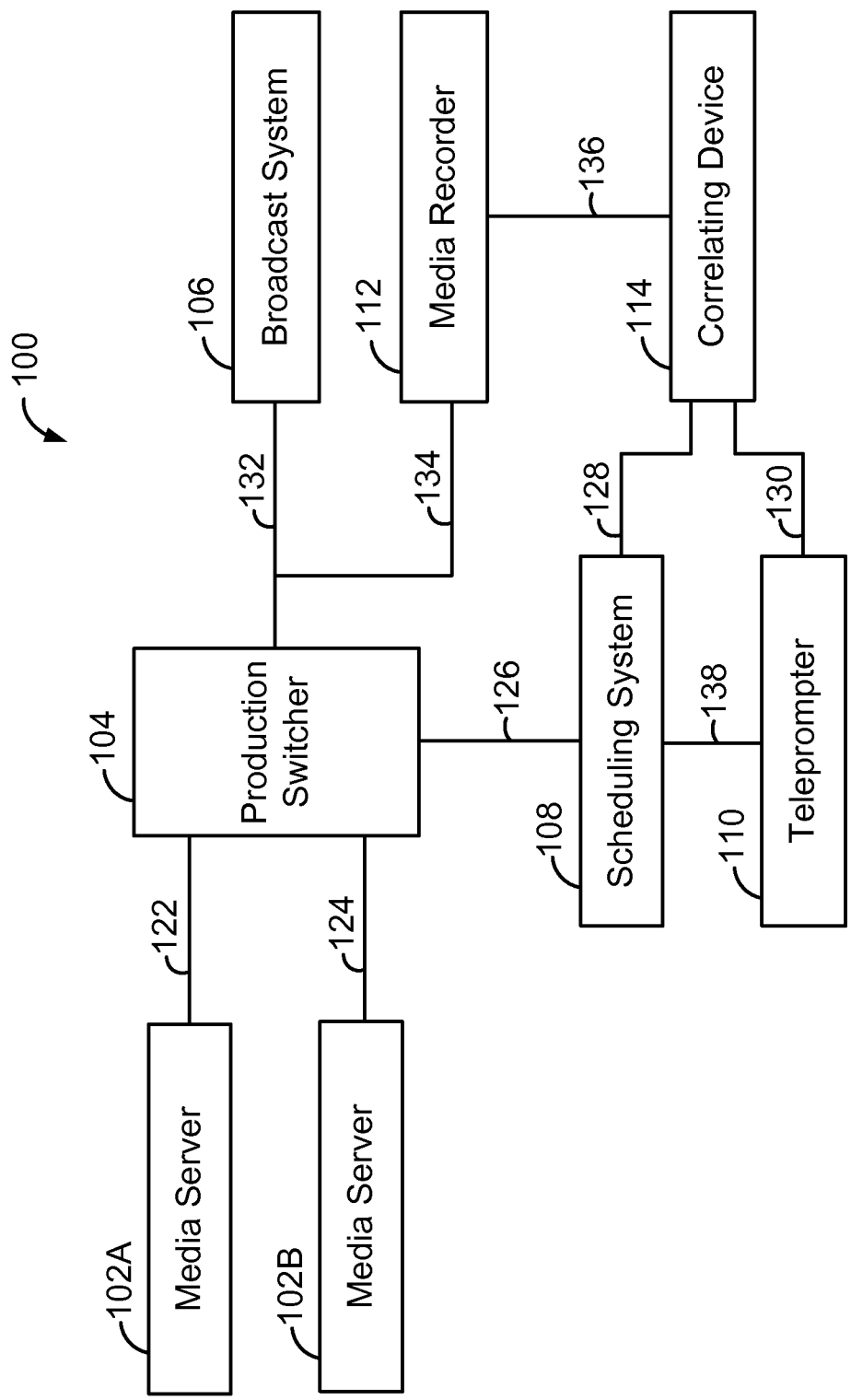
FIG. 1 is a simplified block diagram of an example system.

FIG. 1 is a simplified block diagram of an example system 100. The system 100 may include media servers 102A and 102B, a production switcher 104, a broadcast system 106, a scheduling system 108, a teleprompter 110, a media recorder 112, and a correlating device 114.

The components of the system 100 may be connected with each other and/or with other devices (or systems) via one or more communication paths. For example, a path 122 may connect the media server 102A and the production switcher 104, a path 124 may connect the media server 102B and the production switcher 104, a path 126 may connect the scheduling system 108 and the production switcher 104, a path 128 may connect the scheduling system 108 and the correlating device 114, a path 130 may connect the teleprompter 110 and the correlating device 114, a path 132 may connect the production switcher 104 and the broadcast system 106, a path 134 may connect the production switcher 104 and the media recorder 112, a path 136 may connect the media recorder 112 and the correlating device 114, and a path 138 may connect the scheduling system 108 and the teleprompter 110.

Through these communication paths, a device may transmit various types of data to one or more other devices. For example, one device may transmit instructions to a second device to control the second device. As another example, one device may transit a media stream to another device. One or more of these paths may traverse a communication network. Notably, such devices may exchange data according to one or more standards or protocols. For example, one device may send data to another device in the form of a packet stream.

Generally, each of the media servers 102A and 102B is a device configured for retrieving a media file, converting the retrieved media file into a media stream, and transmitting the converted media stream to another device. For example, each of the media servers 102A and 102B may retrieve a media file from data storage or receive the media file from another device, convert the media file into a media stream, and transmit the media stream to the production switcher 104. Each of the media servers 102A and 102B may be implemented as a computing device. An example of a media server is the K2 server provided by Grass Valley™ of San Francisco, Calif.

Generally, the production switcher 104 is a device configured for using one or more received input media streams to generate an output media-stream. This may involve the production switcher 104 switching between and/or combining multiple media streams received respectively from the media servers 102A and 102B to generate a media program in the form of the output media-stream. The production switcher 104 may provide the output media-stream to the broadcast system 106 for broadcast. The production switcher 104 may be implemented as a computing device. An example of a production switcher is the Vision switcher provided by Ross Video™ of Iroquois, Ontario, Canada.

Generally the broadcast system 106 is a system configured for broadcasting a media stream to multiple receiver devices (e.g., a television or a set-top box). The broadcast system 106 may include subsystems, such as a master-control system and an air-chain system, among other things. In one example, the broadcast system 106 may receive a media stream from the production switcher 104 to be broadcasted by the broadcast system 106.

Generally, the scheduling system 108 is a system configured for performing functions related to scheduling and managing the production of a media program. For example, the scheduling system 108 may be configured for creating or editing a program schedule (sometimes referred to as a "rundown") of a media program based on input received via a user interface. The program schedule may include text representing a summary or outline of predetermined media-program portions (e.g., news stories) that make up the media program. In other examples, the program schedule may include text to be displayed by teleprompter 110 and/or read aloud by an anchorperson of the media program. In some examples, the scheduling system 108 may provide data representing one or more portions of the program schedule to the correlating device 114. The scheduling system 108 may be implemented as a computing device.

Generally, the teleprompter 110 is configured for displaying text that is to be read aloud by an anchorperson of the media program. The teleprompter 110 may include a display component, such as a cathode ray tube, an LCD screen, a plasma screen, etc. In one example, the teleprompter 110 may receive, from the scheduling system 108, data representing the text to be read aloud. In another example, the teleprompter 110 may access such data from a data storage device. In some cases, the teleprompter 110 may provide data representing the displayed text to the correlating device 114. The teleprompter 110 may be implemented as a computing device.

Generally, the media recorder 112 is a device configured for converting a media stream into a media file (this process is sometimes referred to as "recording a media stream"). In one example, the media recorder 112 may receive a media stream from the production switcher 104, convert the received media-stream into a media file, and store the converted media-file in data storage. In one example, the media recorder 112 may provide the converted media-file to the correlating device 114. The media recorder 112 may be implemented as a computing device. An example of a media recorder is the K2 server provided by Grass Valley™ of San Francisco, Calif.

Generally, the correlating device 114 is a device configured for correlating portions of a program schedule of a media program to respective portions of a recording of the media program. In one example, the correlating device 114 may receive from the teleprompter 110, data representing text displayed by the teleprompter 110. Further, the correlating device 114 may receive from the scheduling system 108, data representing the program schedule of the media program. In addition, the correlating device 114 may receive from the media recorder 112, data representing the recorded media-program. The correlating device 114 may be implemented as a computing device.

Figure 2:
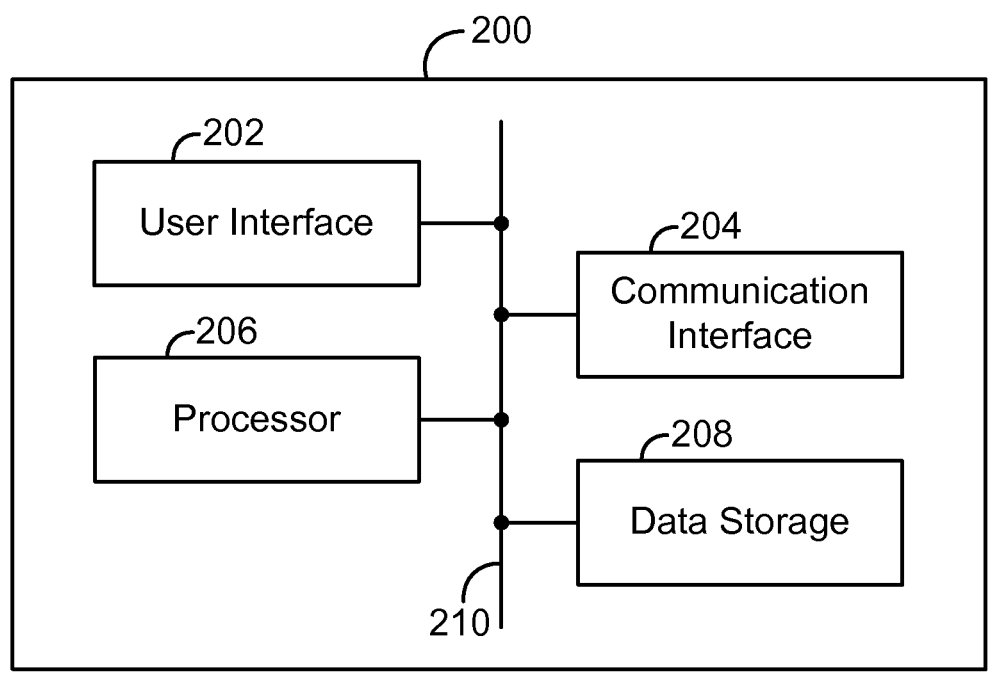
FIG. 2 is a simplified block diagram of an example computing device.

FIG. 2 is a simplified block diagram of an example computing device 200. The computing device 200 may be configured for performing a variety of functions or acts, such as those described in this disclosure (including the accompanying drawings). The computing device 200 may take a variety of forms, including for example a desktop computer, a laptop computer, a tablet computer, or a mobile phone. The computing device 200 may include various components, including for example, a user interface 202, a communication interface 204, a processor 206, and a data storage 208, all of which may be communicatively linked to each other via a system bus, network, or other connection mechanism 210.

The user interface 202 may facilitate interaction with a user of the computing device 200, if applicable. As such, the user interface 202 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system.

The communication interface 204 may take a variety of forms and may be configured to allow the computing device 200 to communicate with one or more devices or systems according to one or more protocols. In one example, the communication interface 204 may take the form of a wired interface, such as an Ethernet interface or an HD-SDI port. As another example, the communication interface 204 may take the form of a wireless interface, such as a cellular or WI-FI interface.

The processor 206 may include a general purpose processor (e.g., a microprocessor) and/or a special purpose processor (e.g., a digital signal processor (DSP)).

The data storage 208 may include one or more volatile, non-volatile, removable, and/or non-removable storage components, such as magnetic, optical, or flash storage, and may be integrated in whole or in part with the processor 206. Further, the data storage 208 may take the form of a non-transitory computer-readable storage medium, having stored thereon program instructions (e.g., compiled or non-compiled program logic and/or machine code) that, when executed by the processor 206, cause the computing device 200 to perform one or more functions or acts, such as those described in this disclosure. Such program instructions may define or be part of a discrete software application that can be executed in response to certain inputs received from the user interface 202, for instance. The data storage 208 may also store other types of information or data, such as those types described throughout this disclosure.

III. Example Program Schedule

Figure 3A:
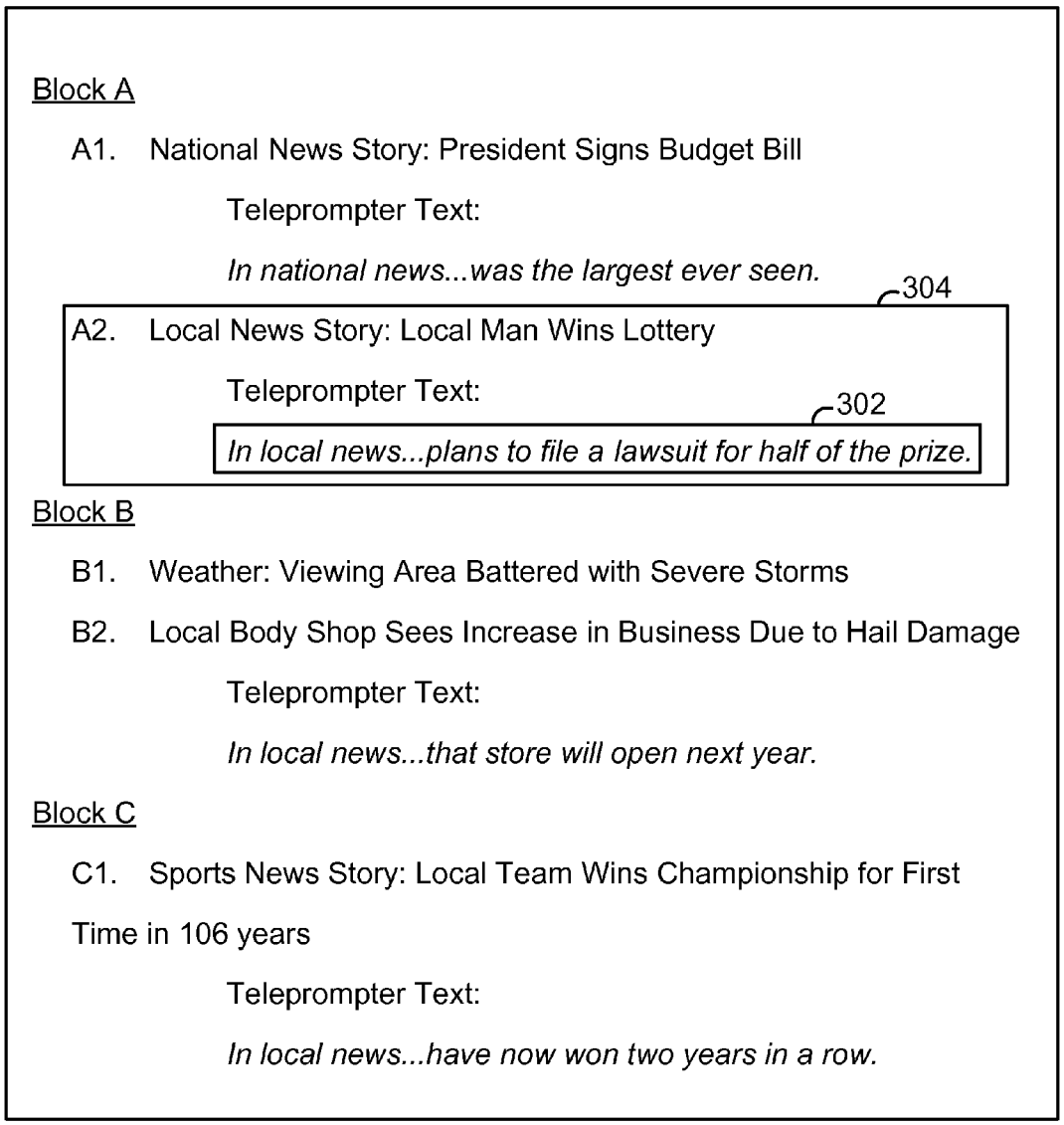
FIG. 3A depicts an example program schedule of a media program in a condensed format.

FIG. 3A depicts an example program schedule 300 of a media program in a condensed format. The program schedule 300 may be broken into blocks of media-program portions. For example, Block A may include news stories A1 and A2, Block B may include news stories B1 and B2, and Block C may include news story C1. As shown, the program schedule 300 may include, for news stories A1, A2, B2, and C1, respective text that is scheduled to be displayed by the teleprompter 110 so that it can be read aloud by an anchorperson. For example, the program schedule 300 may include, for news story A1, text 302. (A particular portion 304 of the program schedule 300 is discussed below in section V.)

FIG. 3B depicts a portion of the example program schedule 300 in greater detail. In particular, FIG. 3B depicts the text 302. (The text 302 may include text 306, which is discussed below in section V.)

IV. Example Teleprompter Display Component

Figure 4:
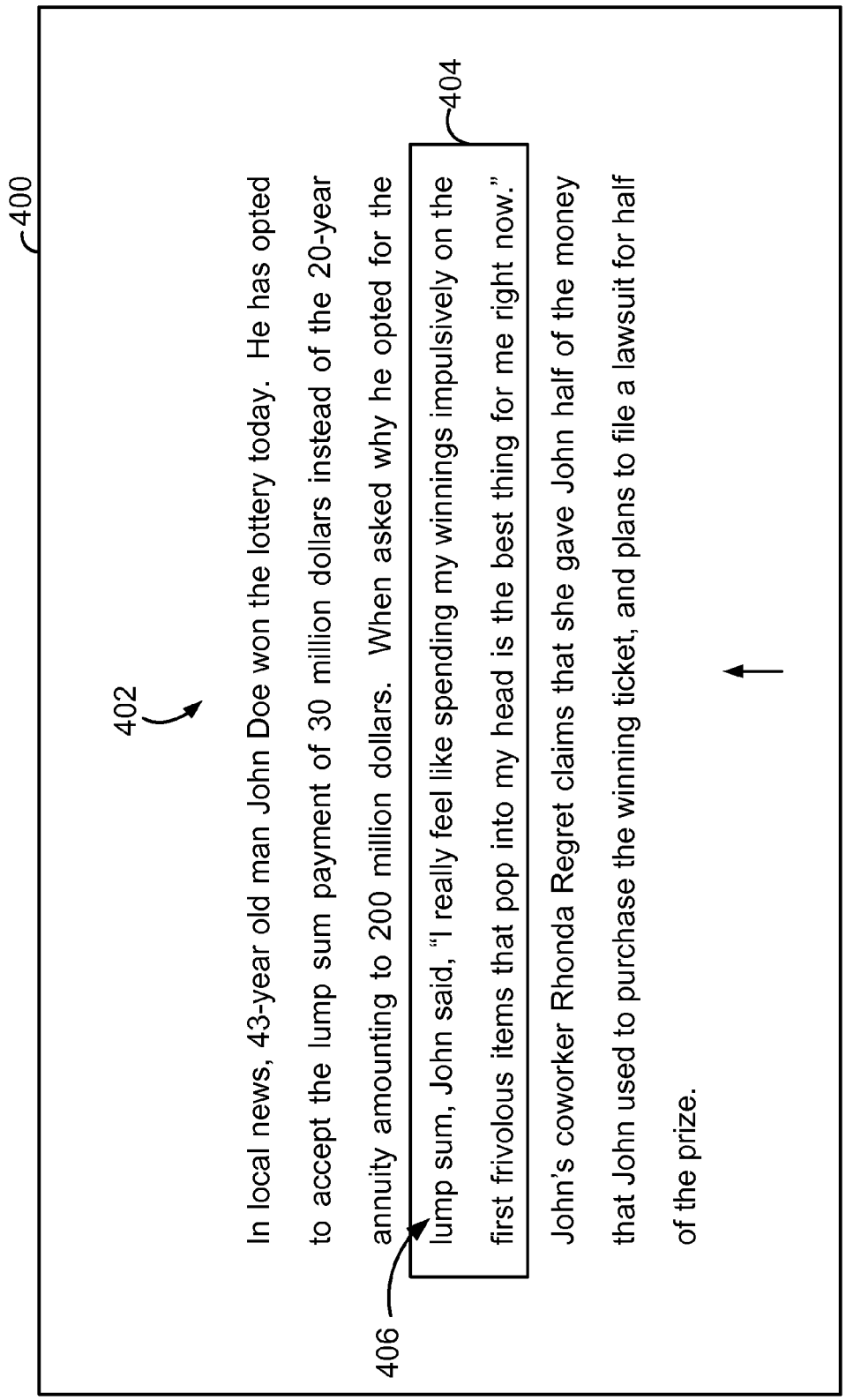
FIG. 4 depicts an example display component of a teleprompter.

FIG. 4 depicts an example display component 400 of the teleprompter 110. The display component 400 may display text 402. The display component 400 may include an active-line region 404 which may roughly indicate real-time progress of the media program. That is, at any given moment, the anchorperson may be reading aloud some of the text displayed in the active-line region 404. (Displayed within the active-line region 404 may be text 406, which is discussed below in section V.)

V. Example Operations

Figure 5:
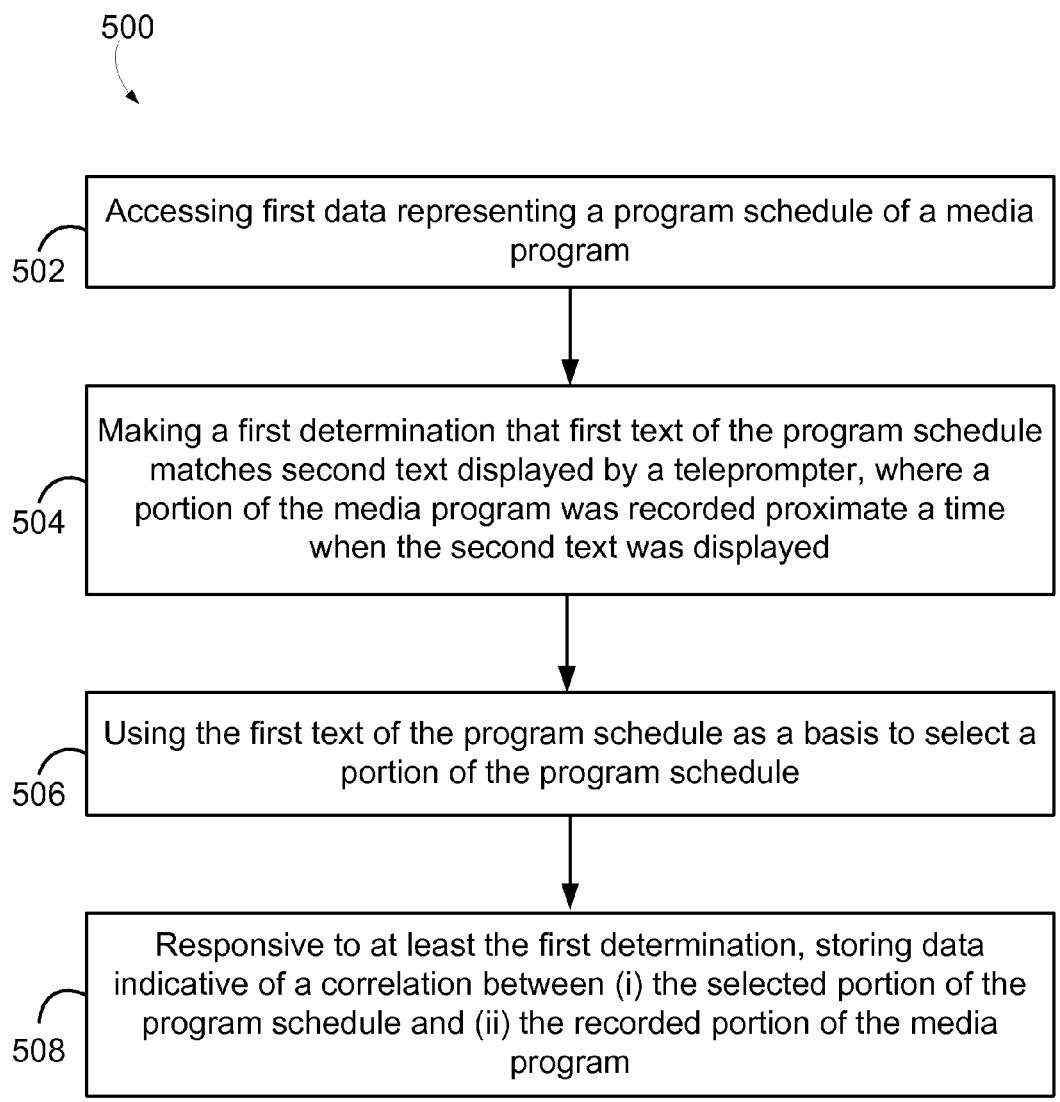
FIG. 5 is a flow diagram of an example method.

FIG. 5 is a flow chart depicting acts that can be carried out in an example method 500.

At block 502, the method 500 involves accessing first data representing a program schedule of a media program. This may involve accessing the first data from a data storage device. In another example, this may involve receiving the first data from a scheduling system. The first data may be accessed from other sources as well. In one example, the act at block 502 may involve the correlating device 114 accessing first data representing the program schedule 300 from the scheduling system 108.

At block 504, the method 500 involves making a first determination that first text of the program schedule matches second text displayed by a teleprompter. The first text may be text of the program schedule, where the text is scheduled to be displayed by the teleprompter. For instance, the first text may be the text 302. The second text may be all of the text being displayed by a teleprompter at a given time. For instance, the second text may be the text 402. Alternatively, the second text may be text displayed in a particular region of a display component of the teleprompter. For instance, the second text may be the text 406. Notably, a portion of the media program may be recorded proximate a time when the second text was displayed. In one example, the act at block 504 may involve the correlating device 114 making a first determination that the text 302 matches the text 406 displayed by the teleprompter 110, where a portion of the media program was recorded proximate a time when the text 406 was displayed by the teleprompter 110.

At block 506, the method 500 involves using the first text of the program schedule as a basis to select a portion of the program schedule. This may involve selecting a portion of the program schedule based on the first text being included within that portion. In one example, the portion may consist of text and other information associated with a particular news story. In one example, the act at block 506 may involve the correlating device 114 using the text 302 as a basis to select the portion 304 of the program schedule 300, where the portion 304 represents a portion associated with the news story A2.

At block 508, the method 500 includes, responsive to at least the first determination, storing data indicative of a correlation between (i) the selected portion of the program schedule and (ii) the recorded portion of the media program. This may involve storing a memory address where data representing the selected portion of the program schedule may be accessed, or storing data representing the selected portion itself. Further, this may involve storing a memory address where data representing the recorded portion of the media program may be accessed, or storing data representing one or more video frames constituting the recorded portion of the media program. In one example, the recorded portion of the media program may be an initial frame of a news story, but alternatively could include some or all of the frames representing the news story. In one example, the act at block 508 may involve responsive to at least the first determination, storing data indicative of a correlation between (i) the portion 304 of the program schedule 300 and (ii) the recorded portion of the media program (that was displayed proximate the time the text 302 was displayed by the teleprompter 110).

Using this data, the correlating device 114 may provide an intuitive user interface that allows a user to select the recorded portion of the media program by selecting the portion 304 of the program schedule 300. For example, the correlating device 114 may provide in the portion 304 of the program schedule 300, a hyperlink that references a memory location where data representing the recorded portion of the media program is stored, thus allowing a user to click the link within the program schedule 300 and be directed to the corresponding recorded portion of the media program.

Further acts related to the method 500 may include making a second determination that the recorded portion of the media program was recorded proximate the time when the second text was displayed. In one example, the correlating device 114 may receive, from the media recorder 112, data that represents the recorded portion of the media program. The correlating device 114 may then determine that the recorded portion of the media program was recorded proximate the time when the text 406 was displayed by the display component 400 by (i) receiving the recorded data contemporaneous with receiving data representing the text 406 from the teleprompter 110, or (ii) comparing timestamps respectively associated with the recorded data and data representing the text 406. In this context, the stored data indicative of the correlation between the selected portion of the program schedule and the recorded portion of the media program may be stored responsive to the second determination (in addition to being stored responsive to the first determination).

Further acts related to the method 500 may involve making a third determination that the teleprompter displayed multiple scrolling characters of text at a scrolling rate that satisfies one or more predetermined criterion, and making a fourth determination that at least a portion of the multiple scrolling characters of text match the first text. In this context, the stored data indicative of the correlation between the selected portion of the program schedule and the recorded portion of the media program may be stored responsive to the third and fourth determinations (in addition to being stored responsive to the first determination). As one example, the characters of the multiple scrolling characters of text may include letters, numbers, spaces, and/or punctuation marks. Other examples of characters are possible.

As shown in FIG. 4, the display component 400 may display the text 402 and other text together in a scrolling fashion, such that the scrolling text appears to move upward through the display component 400. In other examples, the scrolling text may move rightward, leftward, downward, or in some combination of one or more of these directions. In some instances, the correlating device 114 may receive, from the teleprompter 110, data indicating a scrolling rate (e.g., 21 characters per minute upward or 11 characters per minute downward) corresponding to the scrolling text as it moves through the display component 400. In other examples, the correlating device 114 may receive a data stream representing the changing text displayed by the display component 400 as time passes. The correlating device 114 may use the data stream to determine how quickly one or more characters of text of the scrolling text are moving through the display component 400 to determine the scrolling rate.

Based, at least in part, on either (i) the received data representing the scrolling rate or (ii) the determined scrolling rate, the correlating device 114 may make the second determination. For example, making the second determination may include determining that the scrolling rate satisfies one or more predetermined criterion. Such one or more criterion may include the scrolling rate is less than 21 characters per second and/or greater than 11 characters per second, for example. The correlating device 114 may also make a fifth determination that at least a portion of the scrolling text (e.g., the text 406) matches the first text (e.g., the text 306). In this context, the stored data indicative of the correlation between the selected portion of the program schedule and the recorded portion of the media program may be stored responsive to the fifth determination (in addition to being stored responsive to the first determination).

Further acts related to the method 500 may involve receiving an indication of the selected portion of the program schedule; using the received indication and the stored data to select the recorded portion of the media program; and displaying at least a portion of the selected recorded portion of the media program. For example, the correlating device 114 may receive an indication (e.g., a mouse click input) of a hyperlink corresponding to the selected portion of the program schedule. The correlating device 114 may then query a data table that maps the selected portion of the program schedule to the recorded portion of the media program (or a memory address of the recorded portion of the media program). In this way, the correlating device 114 may select the recorded portion of the media program so that the correlating device 114 may display at least a portion (e.g., an initial frame) of the recorded portion of the media program. For example, it may be useful to "cue" the recording of the media program to what has been determined to be an initial frame of a news story, so that an editor may easily select a larger portion of the recording to be associated with the news story.

VI. Example Variations

The variations described in connection with select examples of the disclosed systems, devices, and methods may be applied to all other examples of the disclosed systems, devices, and methods.

Further, while one or more acts have been described as being performed by or otherwise related to certain systems or devices (e.g., the correlating device 114), the acts may be performed by or be otherwise related to any system or device.

Further, the acts need not be performed in the disclosed order, although in some examples, an order may be preferred. Also, not all acts need to be performed to achieve the desired advantages of the disclosed systems, devices, and methods, and therefore not all acts are required.

While select examples of the present disclosure have been described, alterations and permutations of these examples will be apparent to those of ordinary skill in the art. Other changes, substitutions, and alterations are also possible without departing from the invention in its broader aspects as set forth in the following claims.

The invention claimed is:

1. A method comprising:
    accessing first data representing a program schedule of a media program;
    making a determination that first text of the program schedule matches second text displayed by a teleprompter, wherein a portion of the media program was recorded proximate a time when the second text was displayed;

using the first text of the program schedule as a basis to select a portion of the program schedule; and responsive to at least the determination, storing data indicative of a correlation between (i) the selected portion of the program schedule and (ii) the recorded portion of the media program.

2. The method of claim 1, wherein the determination is a first determination, the method further comprising:
making a second determination that the recorded portion of the media program was recorded proximate the time when the second text was displayed,
wherein responsive to at least the first determination comprises responsive to at least the first and second determinations.

3. The method of claim 1, further comprising:
receiving, from the teleprompter, second data representing the second text; and
making the determination based, at least in part, on the received second data.

4. The method of claim 1, wherein the teleprompter comprises a display component having an active line region, and wherein making the determination that first text of the program schedule matches second text displayed by the teleprompter comprises making a determination that first text of the program schedule matches second text displayed in the active line region of the display component.

5. The method of claim 1, wherein the determination is a first determination, the method further comprising:
making a second determination that the teleprompter displayed multiple scrolling characters of text at a scrolling rate that satisfies one or more predetermined criterion; and
making a third determination that at least a portion of the multiple scrolling characters of text match the first text,
wherein responsive to at least the first determination comprises responsive to at least the first, second, and third determinations.

6. The method of claim 5, further comprising:
determining the scrolling rate; and
making the second determination based, at least in part, on the determined scrolling rate.

7. The method of claim 5, wherein the one or more predetermined criterion comprises a criterion that the scrolling rate is less than 21 characters per second.

8. The method of claim 5, wherein the one or more predetermined criterion comprises a criterion that the scrolling rate is greater than 11 characters per second.

9. The method of claim 1, wherein the media program comprises multiple news stories, wherein the selected portion of the program schedule corresponds to a particular one of the multiple news stories, and wherein the recorded portion of the media program comprises an initial frame of the news story.

10. The method of claim 1, further comprising:
receiving an indication of the selected portion of the program schedule;
using the received indication and the stored data to select the recorded portion of the media program; and
displaying at least a portion of the selected recorded portion of the media program.

11. A non-transitory computer-readable medium having instructions stored thereon that when executed cause performance of a set of acts comprising:
accessing first data representing a program schedule of a media program;
making a determination that first text of the program schedule matches second text displayed by a teleprompter, wherein a portion of the media program was recorded proximate a time when the second text was displayed;
using the first text of the program schedule as a basis to select a portion of the program schedule; and
responsive to at least the determination, storing data indicative of a correlation between (i) the selected portion of the program schedule and (ii) the recorded portion of the media program.

12. The non-transitory computer-readable medium of claim 11, wherein the determination is a first determination, the acts further comprising:
making a second determination that the teleprompter displayed multiple scrolling characters of text at a scrolling rate that satisfies one or more predetermined criterion; and
making a third determination that at least a portion of the multiple scrolling characters of text match the first text,
wherein responsive to at least the first determination comprises responsive to at least the first, second, and third determinations.

13. The non-transitory computer-readable medium of claim 12, the acts further comprising:
determining the scrolling rate; and
making the second determination based, at least in part, on the determined scrolling rate.

14. The non-transitory computer-readable medium of claim 12, wherein the one or more predetermined criterion comprises a criterion that the scrolling rate is less than 21 characters per second.

15. The non-transitory computer-readable medium of claim 12, wherein the one or more predetermined criterion comprises a criterion that the scrolling rate is greater than 11 characters per second.

16. The non-transitory computer-readable medium of claim 11, the acts further comprising:
receiving an indication of the selected portion of the program schedule;
using the received indication and the stored data to select the recorded portion of the media program; and
displaying at least a portion of the selected recorded portion of the media program.

17. A computing device comprising:
a processor;
a communication interface; and
a non-transitory computer-readable medium having instructions stored thereon that when executed by the processor cause performance of a set of acts comprising:
accessing, via the communication interface, first data representing a program schedule of a media program;
making a determination that first text of the program schedule matches second text displayed by a teleprompter, wherein a portion of the media program was recorded proximate a time when the second text was displayed;
using the first text of the program schedule as a basis to select a portion of the program schedule; and
responsive to at least the determination, storing data indicative of a correlation between (i) the selected portion of the program schedule and (ii) the recorded portion of the media program.

18. The computing device of claim 17, the acts further comprising:

making a second determination that the teleprompter displayed multiple scrolling characters of text at a scrolling rate that satisfies one or more predetermined criterion; and making a third determination that at least a portion of the multiple scrolling characters of text match the first text, wherein responsive to at least the first determination comprises responsive to at least the first, second, and third determinations.

19. The computing device of claim 18, the acts further comprising:

determining the scrolling rate; and making the second determination based, at least in part, on the determined scrolling rate.

20. The computing device of claim 18, wherein the one or more predetermined criterion comprises a criterion that the scrolling rate is greater than 11 characters per second.

* * * * *